Patented Aug. 24, 1943

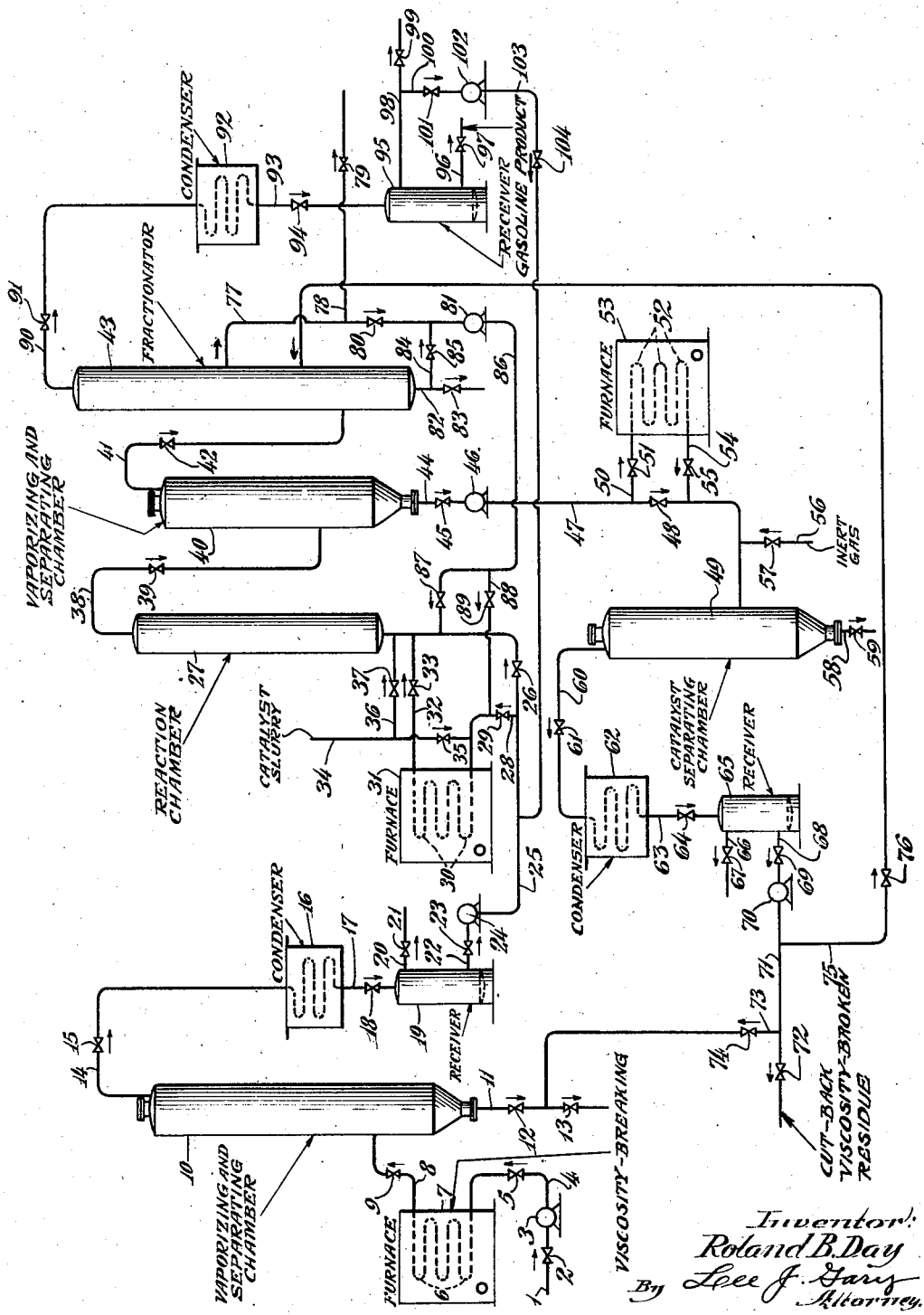

2,327,510

UNITED STATES PATENT OFFICE 2,327,510

CONVERSION OF HYDROCARBON OILS

Roland B. Day, Chicago, Ill., assignor to Universal Oil Products Company, Chicago, Ill., a corporation of Delaware Application March 30, 1940, Serial No. 326,868

9 Claims. (Cl. 196—49)

This invention relates to a process for producing gasoline from a relatively heavy hydrocarbon oil and more specifically to a novel and advantageous combination of steps wherein the hydrocarbon oil feed is both pyrolytically and catalytically treated to produce a gasoline of relatively high octane rating.

The invention involves principally a viscosity breaking operation to produce a relatively light hydrocarbon oil amenable to catalytic cracking, catalytic cracking of said relatively light hydrocarbon oil in the presence of a suspended powdered catalyst, flash distilling the residue from the catalytic cracking operation to substantially separate the catalyst from the vaporous hydrocarbons contained in the residue, and return of said vaporous hydrocarbons to the catalytic cracking operation.

The invention is particularly applicable to the processing of a relatively heavy hydrocarbon oil, such as topped or reduced crude oil, wherein the oil is subjected to viscosity breaking operation employing temperatures in the range of 750 to 850° F., the soaking time in the heating coil preferably being regulated so that only minor amounts of gasoline and gas are produced, the greater proportion of the conversion products boiling substantially in the range of kerosene and/or gas oil, and the pressure employed in the viscosity breaking operation preferably being sufficient to maintain the oil in substantially the liquid phase. The conversion products from the viscosity breaking are preferably flash distilled to produce a relatively low gravity residue, the vaporous conversion products cooled and condensed, and the residue preferably blended with heavy conversion products formed in the catalytic cracking treatment to reduce the viscosity of the former.

The distillate from the viscosity breaking operation is preferably catalytically cracked in the presence of a flowing catalyst and the residue from the catalytic cracking operation containing the suspended catalyst flash distilled to substantially separate the catalyst from the liquid residue admixed therewith. The residue from the catalytic cracking operation may be flash distilled by reducing the pressure thereon in a suitable vaporizing chamber. When the heat content of said residue is insufficient to effect substantially complete vaporization at the reduced pressure additional heat may be supplied thereto and, when desired, a suitable inert gas, such as steam or normally gaseous products formed in the process, may be admixed therewith to assist in the vaporization thereof. In some cases, in order to obtain the desired separation the flash distilling zone may be operated at a sub-atmospheric pressure which may be produced by any of the well known means. The distillate obtained from this flash distillation may be commingled in part with the residue from the viscosity breaking operation to reduce the viscosity thereof and the remaining portion thereof returned to the catalytic cracking operation for further conversion or, when desired, all or a part may be recovered as a product of the process.

In one embodiment the invention comprises heating the feed (a reduced crude oil) to a viscosity breaking temperature, maintaining the oil at this temperature for a sufficient period of time to effect substantial conversion to light oil, substantially separating the conversion products into vaporous conversion products and non-vaporous liquid residue, recovering the latter, cooling and condensing said vaporous conversion products, heating the resulting distillate to a catalytic cracking temperature and commingling the heated distillate with a slurry composed of catalyst and hydrocarbon oil and supplying the mixture to a reaction chamber wherein sufficient time is allowed to effect the desired reaction, supplying the resulting conversion products to a vaporizing and separating chamber wherein vaporous conversion products are substantially separated from the nonvaporous liquid residue and catalyst, supplying the vaporous conversion products to a fractionator wherein fractionated vapors boiling substantially in the range of gasoline are separated from the intermediate conversion products and the latter condensed as reflux condensate, returning said reflux condensate to said reaction chamber for further conversion, cooling and condensing said fractionated vapors and recovering the resulting distillate and gas, supplying the mixture of non-vaporous liquid residue and catalyst separated as hereinbefore set forth to a catalyst separating chamber wherein the mixture is flash distilled to substantially separate the hydrocarbon oil from the catalyst, recovering the latter and removing, cooling and condensing the hydrocarbon oil vapors, commingling a portion of the resulting distillate with the non-vaporous liquid residue from the viscosity breaking operation and supplying the remaining portion thereof to said fractionator for treatment therein in commingled state with the vaporous conversion products from said vaporizing and separating chamber.

The accompanying diagrammatic drawing illustrates in conventional side elevation one specific form of the apparatus which may be employed to accomplish the objects of the invention.

Referring to the drawing, the feed comprising a topped or reduced crude oil is supplied through line 1 and valve 2 to pump 3 which discharges through line 4 and valve 5 into heating coil 6. The oil introduced to heating coil 6 is raised to the desired conversion temperature which may range, for example, from 750 to 850° F. by means of heat supplied from furnace 7. Preferably also, a soaking time is allowed in heating coil 6 to effect conversion to lighter oils with a minimum production of gasoline and gas. The heated oil leaving heating coil 6 at a superatmospheric pressure ranging, for example, from 50 to 200 pounds or more per square inch is directed through line 8 and valve 9 into a reduced pressure vaporizing and separating chamber 10. Vaporizing and separating chamber 10 is preferably operated at a reduced pressure relative to that employed in heating coil 6 and may range, for example, from 10 to 75 pounds or more per square inch. Vaporous and liquid conversion products are separated within chamber 10 and the liquid conversion products further vaporized therein to form a non-vaporous liquid residue. The non-vaporous liquid residue is removed from chamber 10 by way of line 11 and valves 12 and 13 and recovered as a product of the process or, when desired, may be commingled with a less viscous residue separated in the manner to be described later, in order to reduce the viscosity of the residue separated as above described, and the mixture recovered as a product of the process.

Vaporous conversion products, together with vapors evolved within chamber 10, are removed therefrom by way of line 14 and directed through valve 15 to cooling and condensation in condenser 16. Distillate, together with undissolved and uncondensed gases from condenser 16, is directed through line 17 and valve 18 to receiver 19 wherein the distillate and gases are collected and separated. Undissolved and uncondensed gases collected and separated in receiver 19 are removed therefrom by way of line 20 and valve 21 and recovered as a product of the process.

The distillate collected and separated in receiver 19 is removed therefrom by way of line 22 and directed through valve 23 to pump 24. Pump 24 discharges through line 25 wherein the distillate may be commingled with normally gaseous products formed as hereinafter described, and the mixture may then be directed through valve 26 into reaction chamber 27 for treatment in the manner to be described later. Preferably, however, the mixture in line 25 is directed through line 28 and valve 29 into heating coil 30. The oil in passing through heating coil 30 is raised to the desired conversion temperature which may range, for example, from 700 to 1100° F. without substantial pyrolytic cracking being effected, heat being supplied from furnace 31. The heated oil leaving heating coil 30 is directed through line 32 and valve 33 into line 25 by means of which it is introduced to reaction chamber 27. Reflux condensate formed and separated in the manner to be described later may be commingled with the distillate supplied to heating coil 30 or, when desired, may be introduced directly to line 25 by means of which it is supplied to reaction chamber 27. In the preferred embodiment, since the reflux condensate is the more refractory of the two oils introduced to reaction chamber 27, it is supplied to heating coil 30 and raised therein to a temperature above the desired conversion temperature and thereafter commingled with the distillate in line 25 which by-passes heating coil 30, the blend of the two oils being at the desired conversion temperature. In some cases, however, the blend of the two oils may be below the desired conversion temperature and, in such instances, at least a portion of the distillate in line 25 may be directed through line 28 into heating coil 30 in the manner previously described.

The catalyst slurry, comprising a mixture of the desired catalyst in a suitable hydrocarbon oil, is supplied to the system through line 34 and may be directed through valve 35 into line 28, commingling therein with the hydrocarbon oil introduced to heating coil 30. Preferably, however, the catalyst slurry is directed through line 36 and valve 37 into line 25, commingling therein with the mixture of reflux condensate and distillate which is at the desired conversion temperature prior to the introduction of this mixture to reaction chamber 27.

Catalysts which have been found to be effective in the catalytic cracking of hydrocarbon vapors may comprise granules of silica or other siliceous and refractory materials composited with compounds selected from the group consisting of alumina, zirconia, vanadia, and thoria. In addition, the hydro-silicates of alumina, acid treated clays, or the like, have also been found to be effective in the cracking treatment of hydrocarbon vapors.

Although the catalysts above recited are generally considered to be the preferred catalysts, their use is not to be construed as a limiting feature, for various other catalysts well known to those in the art may be employed within the broad scope of the invention. Temperatures during conversion may range, for example, from 700 to 1100° F. while employing a pressure varying from substantially atmospheric to 1000 pounds or more superatmospheric.

The hydrocarbon oil used in preparing the catalyst slurry may comprise, for example, intermediate conversion products formed in the process or, when desired, a portion of the distillate collected in receiver 19 or any other hydrocarbon oil suitable for such purposes. The hydrocarbon oil to be converted, containing the suspended catalyst, passes through reaction chamber 27 at which time the desired conversion reaction is effected. The reaction products containing the suspended catalyst are removed from reaction chamber 27 by way of line 38 and are directed through valve 39 into vaporizing and separating chamber 40.

Chamber 40 is preferably operated at a reduced pressure relative to that employed in heating coil 30 and reaction chamber 27 and this pressure may range, for example, from substantially atmospheric to 200 pounds or more per square inch. The vaporous conversion products are separated from the non-vaporous liquid conversion products and catalyst and the vaporous conversion products removed from chamber 40 by way of line 41 and directed through valve 42 into fractionator 43 for treatment in the manner to be described later.

The non-vaporous liquid conversion products containing the suspended catalyst are removed from chamber 40 by way of line 44 and are directed through valve 45 into pump 46 which discharges through line 47 and valve 48 into catalyst separating chamber 49. Catalyst separating chamber 49 is preferably operated at a reduced pressure relative to that employed in chamber 40 and may range, for example, from substantially atmospheric to 75 pounds or more per square inch and in some cases a sub-atmospheric pressure may be employed. When the heat content of the oil supplied in admixture with the catalyst to chamber 49 is insufficient for substantially complete vaporization to be effected in chamber 49, heat may be added to the mixture of catalyst and oil by directing said mixture from line 47 through line 50 and valve 51 into heating coil 52 to which heat is supplied from furnace 53. The temperature to which the oil is raised in passing through heating coil 52 will vary depending upon the type of charging stock employed and the type of residue obtained from the operation, hence no exact temperature range can be stated. In any event, the heated oil leaving heating coil 52 is returned to line 47 by way of line 54 and valve 55. When desired, a suitable inert gas, such as steam or hydrocarbon gases formed in the process or any other gas suitable for the purpose, may be supplied through line 56 and valve 57 and commingled with the mixture of oil and catalyst in line 47 to assist in the vaporization of the oil in chamber 49.

In any case, the mixture supplied to chamber 49 is flash distilled therein to substantially separate the hydrocarbon oil from the catalyst. When a relatively high boiling hydrocarbon oil is present in the mixture supplied to chamber 49, this separation step may be operated so that the high boiling, non-vaporizing oils are removed with the catalyst. One or more catalyst separating chambers may be employed, when desired, in order that they may be alternately partially filled with catalyst and cleaned, however, ordinarily one chamber is sufficient to accomplish the desired result. The catalyst separated in chamber 49, in some cases containing the heavy non-vaporous liquid hydrocarbons, removed from the lower portion thereof by way of line 58 and valve 59, may be disposed of or subjected to a burning operation to reactive the catalyst which is later returned to the system, although the means for accomplishing this are not illustrated. The hydrocarbon oil vaporized within chamber 49 is removed from the upper portion thereof by way of line 60 and is directed through valve 61 to cooling and condensation in condenser 62.

Distillate, together with undissolved and uncondensed gases from condenser 62, is directed through line 63 and valve 64 into receiver 65 wherein the distillate and gases are collected and separated. Undissolved and uncondensed gases are removed from receiver 65 by way of line 66 and valve 67. Distillate separated in receiver 65 is removed therefrom by way of line 68 and is directed through valve 69 into pump 70. Pump 70 discharges through line 71 and all or a portion of the distillate may be directed through valve 72 and recovered as a product of the process. Preferably, however, at least a portion of the distillate is directed through line 73 and valve 74 and commingled with the non-vaporous liquid residue separated in chamber 10 and removed therefrom by way of line 11 in order to reduce the viscosity in the manner previously described. In some cases, the distillate separated from the catalyst in the manner above described may comprise a suitable cracking stock, in which case the portion not commingled with the liquid residue in line 11 may be directed through line 75 and valve 76 into fractionator 43 for treatment in the manner to be described.

The hydrocarbons supplied to fractionator 43 are fractionated therein to separate fractionated vapors boiling substantially in the range of gasoline from the higher boiling hydrocarbons and the latter condensed as reflux condensate. When heavy hydrocarbons are present in the catalytic cracking step, a light reflux condensate may be separated from the heavy reflux condensate. Either the light reflux condensate or the heavy reflux condensate or both may be supplied to the catalytic cracking treatment and one or the other or both may be recovered, when desired, as products of the process. The light reflux condensate may be removed from fractionator 43 by way of line 77 and recovered as a product of the process by directing it through line 78 and valve 79. Preferably, however, it is directed through valve 80 to pump 81. Heavy reflux condensate removed from fractionator 43 by way of line 82 is directed through valve 83 and may be recovered as a product of the process or, when desired, may be directed through line 84 and valve 85 into line 77 by means of which it is supplied to pump 81. Pump 81 discharges through line 86 and the reflux condensate may be directed through valve 87 into line 25 by means of which it is introduced to reaction chamber 27. Preferably, however, it is directed through line 88 and valve 89 into line 28 by means of which it is supplied to heating coil 30 for treatment in the manner previously described.

Fractionated vapors separated in fractionator 43 are directed through line 90 and valve 91 to cooling and condensation in condenser 92. Distillate, together with undissolved and uncondensed gases in condenser 92, is directed through line 93 and valve 94 into receiver 95 wherein the distillate and gases are collected and separated. The gasoline distillate collected in receiver 95 is removed therefrom by way of line 96 and valve 97 and recovered as a product of the process or subjected to any desired further treatment. Undissolved and uncondensed gases separated in receiver 95 are removed therefrom by way of line 98 and may be directed through valve 99 and recovered as a product of the process, but preferably at least a portion is directed through line 100 and valve 101 to compressor 102 which discharges through line 103 and valve 104 into line 25 for treatment in the manner previously described.

An example of one specific operation of the process as it may be accomplished in an apparatus such as illustrated and above described is approximately as follows:

The feed comprising a 25° A. P. I. gravity Mid-Continent reduced crude oil is heated to a temperature of 800° F., at a superatmospheric pressure of 150 pounds per square inch, and a soaking time of approximately 4 minutes allowed in the heating coil. The vaporous conversion products formed in this treatment are substantially separated from the non-vaporous liquid residue in a reduced pressure vaporizing and separating chamber operated at a superatmospheric pressure of 25 pounds per square inch, and the non-vaporous liquid residue of aproximately 400 Saybolt furol viscosity is blended with distillate in the manner to be described later to produce residue having a Saybolt furol viscosity of 200 seconds.

The vaporous conversion products separated as above described are cooled and condensed and the resulting distillate commingled with the reflux condensate formed as hereinafter described and the mixture heated to a temperature of 930°

F. after which it is commingled with a slurry of silica-alumina catalyst formed by mixing the catalyst with a portion of the reflux condensate formed in the process. The mixture of catalyst and heated oil containing approximately 5% of suspended catalyst is supplied to a reaction chamber maintained under a superatmospheric pressure of approximately 40 pounds per square inch wherein cracking of the hydrocarbon oil is effected through intimate contact with the catalyst. The conversion products and catalyst are supplied to a reduced pressure vaporizing and separating chamber operated at a superatmospheric pressure of approximately 20 pounds per square inch wherein vaporous conversion products are separated from the non-vaporous liquid conversion products and catalyst and the vaporous conversion products supplied to a fractionator for treatment as hereinafter described.

The non-vaporous liquid conversion products containing the suspended catalyst are heated to a temperature of approximately 750° F. and supplied to a catalyst separating chamber operated at substantially atmospheric pressure wherein the mixture is flash distilled to substantially separate the hydrocarbon oil as vapors from the catalyst. The catalyst is removed from the catalyst separating chamber and regenerated and returned to the system, while the vapors separated in the catalyst separating chamber are cooled and condensed and the resulting distillate and gas collected and separated. A portion of this distillate is commingled with the non-vaporous liquid residue separated in the first mentioned separating chamber to reduce its viscosity in the manner previously described, while the remaining portion thereof is supplied to the fractionator.

The vaporous conversion products from the second mentioned separating chamber and the distillate separated in the last mentioned separating chamber are fractionated to separate fractionated vapors of approximately 400° F. end point from the higher boiling hydrocarbons and the latter condensed as reflux condensate, the reflux condensate being subjected to treatment in the manner previously described. The fractionated vapors are cooled and condensed and the resulting distillate and gas collected and separated. Distillate is recovered as a product of the process and a portion of the gas is commingled with the hydrocarbon oil mixture subjected to catalytic cracking treatment in the manner previously described.

From the above described operation approximately 65% of 400° F. end point gasoline may be obtained having an octane rating of approximately 75 and approximately 20% of 200 Saybolt furol viscosity, residuum, the balance being principally gas and loss.

I claim as my invention:

1. A process for the production of high antiknock gasoline, which comprises subjecting a hydrocarbon oil charge to pyrolytic cracking under viscosity breaking conditions, separating a light oil from the heavier conversion products, subjecting said light oil to catalytic cracking in the presence of a suspended flowing catalyst, separating vaporous conversion products from residue containing the catalyst, fractionating said vaporous conversion products to obtain a gasoline product, flash distilling said residue to separate oil from catalyst, and commingling at least a portion of the separated oil with said heavy conversion products.

2. A process for the production of high antiknock gasoline, which comprises subjecting a hydrocarbon oil charge to pyrolytic cracking under viscosity breaking conditions, separating a light oil from the heavier conversion products, subjecting said light oil to catalytic cracking in the presence of a suspended flowing catalyst, separating cracked vapors from residue containing the suspended catalyst, fractionating said cracked vapors to form reflux condensate and to separate fractionated vapors boiling in the range of gasoline returning reflux condensate to the catalytic cracking step, separating normally gaseous products from said fractionated vapors and supplying at least a portion thereof to the catalytic cracking step, flash distilling said residue to separate oil from catalyst, and commingling at least a portion of the separated oil with said heavy conversion products.

3. A process for the production of high antiknock gasoline, which comprises subjecting a hydrocarbon oil charge to pyroltic cracking under viscosity breaking conditions, supplying the conversion products to a vaporizing and separating chamber and therein separating vapors from non-vaporous liquid residue, cooling and condensing said vapors, commingling the resulting distillate with intermediate conversion products formed as hereinafter set forth and subjecting the mixture to catalytic cracking with catalyst suspended therein, supplying the conversion products containing the suspended catalyst to a vaporizing and separating chamber wherein vaporous conversion products are substantially separated from the liquid residue and catalyst, fractionating said vaporous conversion products to separate the gasoline product from the intermediate conversion products, returning at least a portion of the latter to the catalytic cracking step, supplying the residue containing the suspended catalyst to a catalyst separating chamber wherein the mixture is flash distilled to substantially separate catalyst and oil, recovering the former and commingling at least a portion of the latter with the residue from the first mentioned separating chamber.

4. A process for the production of high antiknock gasoline, which comprises subjecting a hydrocarbon oil charge to pyrolytic cracking under viscosity breaking conditions, supplying the conversion products to a vaporizing and separating chamber and therein separating vapors from the non-vaporous liquid residue, recovering the latter, cooling and condensing said vapors, commingling the resulting distillate with intermediate conversion products formed as hereinafter set forth and a catalyst to form a suspension of the former in the oil mixture and heating the resulting mixture to a cracking temperature, supplying the heated mixture to a reaction chamber wherein further conversion is effected, supplying the conversion products containing the suspended catalyst to a vaporizing and separating chamber wherein vaporous conversion products are substantially separated from the liquid residue and catalyst, fractionating said vaporous conversion products to separate gasoline from the intermediate conversion products, returning the latter to the conversion treatment and supplying the residue containing the suspended catalyst to a catalyst separating chamber wherein the mixture is flash distilled to substantially separate catalyst and oil, recovering the former and commingling at least a portion of the latter with the residue from the first mentioned separating chamber.

5. A process for the production of high antiknock gasoline, which comprises subjecting a hydrocarbon oil charge to pyrolytic cracking under viscosity breaking conditions, supplying the conversion products to a vaporizing and separating chamber and therein separating vapors from non-vaporous liquid residue, recovering the latter, cooling and condensing said vapors, commingling the resulting distillate with intermediate conversion products formed as hereinafter set forth and heating the mixture to a cracking temperature, commingling the heated mixture with a catalyst to form a suspension thereof and supplying the resulting mixture to a reaction chamber, supplying the conversion products containing the suspended catalyst to a vaporizing and separating chamber wherein vaporous conversion products are substantially separated from the liquid residue and catalyst, fractionating said vaporous conversion products to separate the gasoline product from the intermediate conversion products and to separate said intermediate products into light and heavy reflux condensate, recovering said heavy reflux condensate and returning said light reflux condensate to the heating step, supplying the residue containing the suspended catalyst to a catalyst separating chamber wherein the mixture is flash distilled to substantially separate catalyst and oil, recovering the former and commingling at least a portion of the latter with the residue from the first mentioned separating chamber.

6. A process for the conversion of hydrocarbon oil which comprises viscosity-breaking a relatively heavy oil under conditions selected to effect conversion into a relatively light oil and non-vaporous residue, separating said light oil from the non-vaporous residue, subjecting the former to catalytic cracking in the presence of a cracking catalyst suspended therein, separating liquid residue containing the suspended catalyst from catalytically cracked vapors, flash distilling said liquid residue to separate oil from catalyst and combining at least a portion of the separated oil with said non-vaporous residue.

7. The process of claim 6 further characterized in that the cracked vapors are fractionated to form reflux condensate and at least a portion of the latter returned to the catalytic cracking step.

8. The process of claim 6 further characterized in that viscosity breaking of the heavy oil comprises pyrolytic viscosity breaking.

9. The process of claim 6 further characterized in that the cracked vapors are fractionated to form reflux condensate and to separate fractionated vapors, the latter cooled and condensed, the resulting distillate separated from normally gaseous products and at least a portion of the latter supplied to the catalytic cracking step.

ROLAND B. DAY.